United States Patent [19]
Levitan

[11] 3,770,550
[45] Nov. 6, 1973

[54] PACKET-TYPE LAMINATING MACHINE

[76] Inventor: Maurice D. Levitan, 218 Westmoreland Dr., Wilmette, Ill. 60091

[22] Filed: Sept. 3, 1971

[21] Appl. No.: 177,678

[52] U.S. Cl.............. 156/498, 100/93 P, 100/265, 100/295, 156/555, 156/556, 156/583
[51] Int. Cl............................................ B30b 15/34
[58] Field of Search................. 156/498, 556, 555, 156/583; 100/90, 93 P, 265, 295

[56] References Cited
UNITED STATES PATENTS

| | | | |
|---|---|---|---|
| 1,762,135 | 6/1930 | Linn et al. | 156/556 |
| 3,367,261 | 2/1968 | Kashiwabi | 100/93 P |
| 3,113,506 | 10/1963 | Faeber | 100/222 X |
| 3,506,521 | 4/1970 | Hullen et al. | 100/222 X |
| 3,378,430 | 4/1968 | Aizawa | 156/556 |

Primary Examiner—Edward G. Whitby
Attorney—Seymour Rothstein et al.

[57] ABSTRACT

A packet-type laminating machine for laminating a card-like member, such as an identification photograph, into a pre-cut pouch or between a pair of protective sheets comprises rotatable feeding rollers and a pair of heated platens adjacent to and rearwardly oriented from the rotatable feeding rollers. The heated platens are adapted to receive the elements to be laminated carried in the packet and heat as well as apply pressure thereto. The forward portions of the heated platens are biased so as to squeeze air from between the elements prior to lamination to prevent entrapment of air between the laminated elements. A pair of expeller rollers are mounted adjacent the rear of the heated platens for drawing the packet containing the laminated elements from between the heated platens, and cooling means are provided adjacent the expeller rollers for cooling the laminated elements. A feeding roller and an expeller roller are mounted rotatably in a common link member in such manner that the feeding rollers will be separated from one another when the carrier or packet containing the laminated elements enters between the expeller rollers.

15 Claims, 7 Drawing Figures

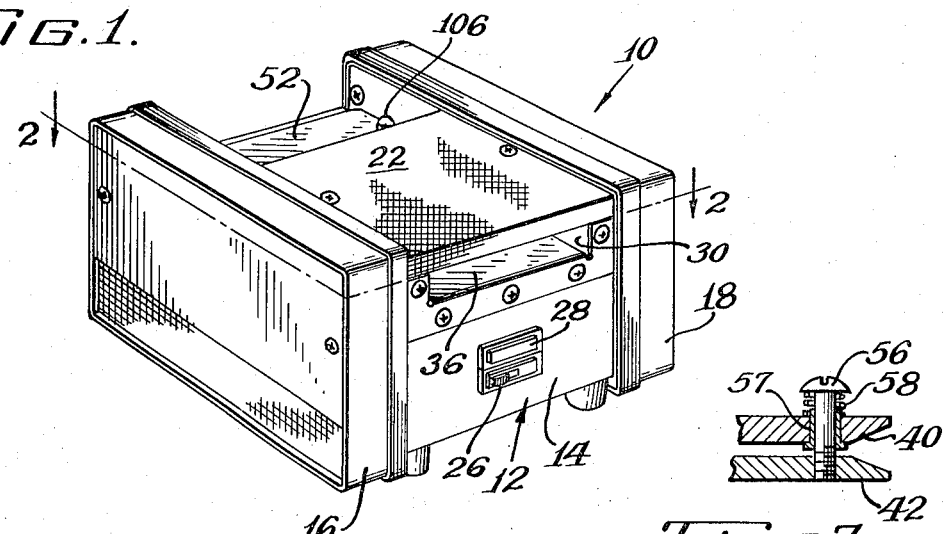
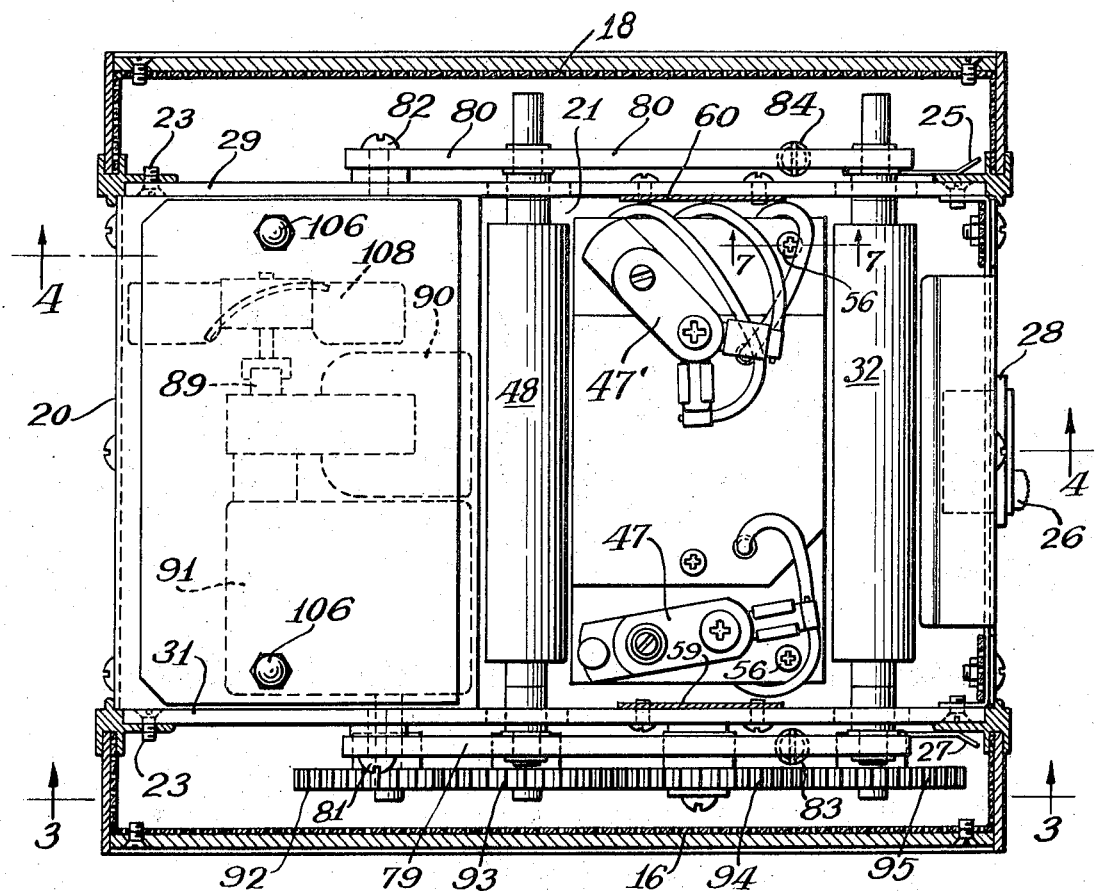

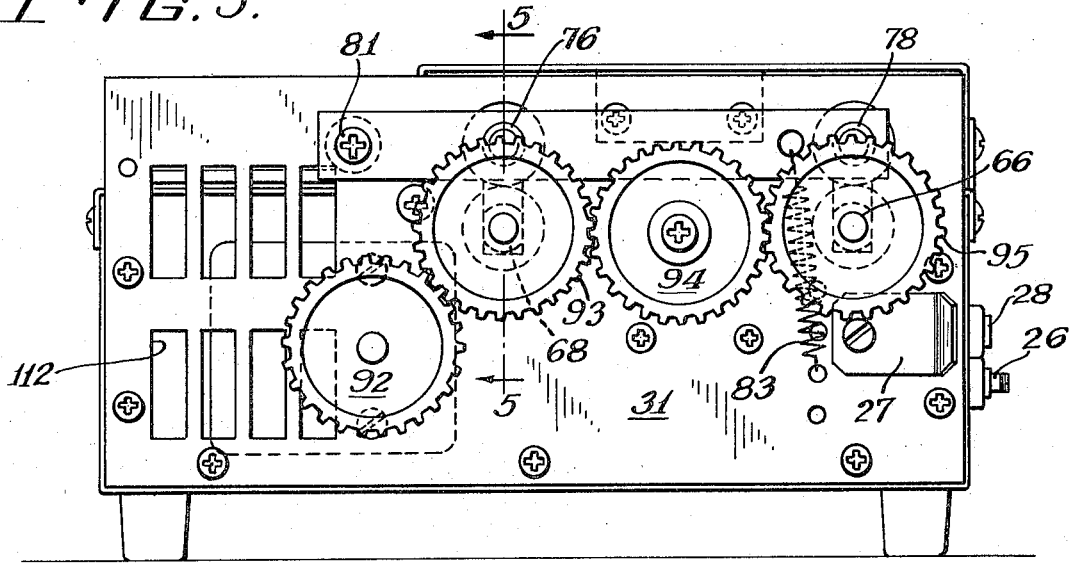
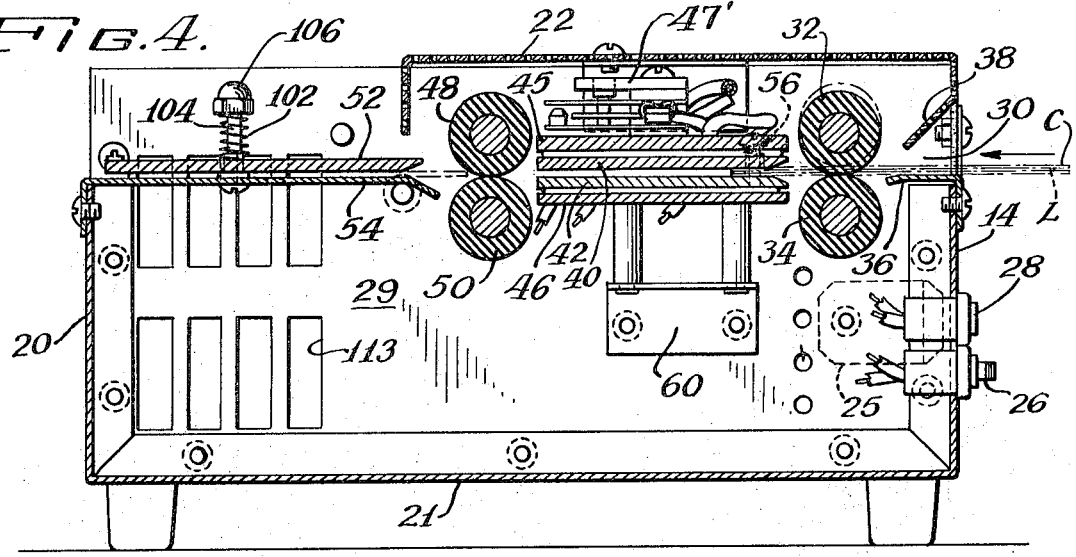
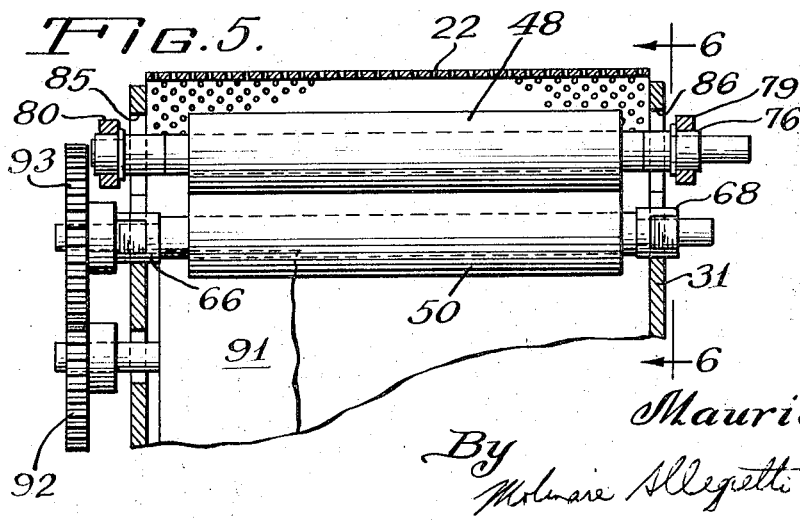

PACKET-TYPE LAMINATING MACHINE

BACKGROUND OF THE INVENTION

This invention relates to laminating machines and more particularly, to a laminating machine for laminating a card-like member, such as a card or a photograph, in a protective plastic film, for example, a pre-cut pouch. More particularly, this invention is concerned with a packet-type laminating machine employing a packet or carrier for containing the elements to be laminated during their passage through the laminating machine.

In past, various attempts have been made to laminate a card or a photograph in a pre-cut pouch or between protective plastic film. Some machines have utilized a pair of rollers positioned in front of platens to feed a carrier containing a card within a pouch between the two platens, with a pair of rollers positioned after the heated platens to withdraw the carrier carrying the laminated card and film. In some prior machines, the platens were gapped or spaced from one another and thus, the laminating was performed in an oven-like atmosphere. Curling or unevenness of lamination resulted. Other machines had platens that moved toward one another to apply pressure between the platens to clamp the carrier and thus effect lamination of the plastic film to the card therebetween. Normally, a relatively stiff carrier was required and it was found that the mass of the carrier adversely affected the heating and then the cooling of the elements to be laminated.

In addition, it was difficult to expel entrapped air from between the layers of the lamination when an oven-type laminating machine was used. The air pockets or bubbles were unsightly when a card was laminated between sheets of film, and had the effect of distorting a photograph that was laminated between sheets of film or in a pre-cut pouch.

In prior packet-type laminating machines utilizing feeding and expeller rollers, the speed and alignment of the two pairs of rollers had to be precise in order to prevent buckling or twisting of the carrier and thus, imperfection in the laminated elements.

A primary object of the present invention is to provide an improved packet-type laminating machine wherein the objections and disadvantages of prior constructions are obviated.

Another object of the present invention is to provide an improved packet-type laminating machine incorporating rotatable feeding rollers and a pair of heated platens, with novel means for mounting the heated platens so as to bias the forward portion thereof to squeeze the air from between the elements prior to lamination so as to prevent entrapment of air between the laminated elements.

Yet another object of the present invention is to provide an improved laminating machine with novel means for mounting the feeding rollers and the expeller rollers such that when a carrier containing elements to be laminated enters the expeller rollers, the feeding rollers are separated or moved apart one relative to the other to assist in producing a flat lamination of elements, rather than one that is twisted or warped.

Still another object of the present invention is to provide an improved packet-type laminating machine with cooling means for cooling the laminated elements, the cooling means comprising a pair of plates movable relative to one another so as to contactingly receive the laminated elements, with fan means for cooling at least one of said plates.

Yet another object of the present invention is to provide improved means for mounting and linking the feeding rollers and expeller rollers in a packet-type laminator so that minimum spacing may be provided between successive packets, whereby the feed of packets to the machine may be substantially continuous. Other objects and advantages of the present invention will become more apparent hereinafter.

BRIEF DESCRIPTION OF THE DRAWING

There is shown in the attached drawing a presently preferred embodiment of the present invention, wherein like numerals refer to like elements in the various views and wherein:

FIG. 1 is a perspective view of an improved packet-type laminating machine embodying principles of the present invention;

FIG. 2 is a cross-sectional view of the laminating machine taken generally along the line 2—2 of FIG. 1;

FIG. 3 is a cross-sectional view of the laminating machine taken generally along the line 3—3 of FIG. 2;

FIG. 4 is a cross-sectional view of the laminating machine taken generally along the line 4—4 of FIG. 2;

FIG. 5 is a detail cross-sectional view of the laminating machine taken generally along the line 5—5 of FIG. 3;

FIG. 6 is a detail view of the laminating machine taken generally along the line 6—6 of FIG. 5; and FIG. 7 is a detail view of the improved laminating machine taken generally along line 7—7 of FIG. 2.

DETAILED DESCRIPTION OF THE PRESENT INVENTION

Referring now to FIG. 1, there is illustrated a packet-type laminating machine embodying principles of this invention. The laminating machine is adapted to receive elements to be laminated carried in a carrier, pouch or packet. The elements to be laminated may comprise a card or photograph disposed in a pre-cut plastic member or a card or photograph disposed between two sheets of protective plastic film.

The laminating machine 10 comprises a housing 12 enclosing and supporting the components of the machine. The housing 12 includes a front cover 14, said covers 16 and 18, a rear cover 20 (FIG. 2), a bottom 21 (FIG. 4) and a top cover 22. If desired, members 14, 17 and 20 can be formed from a unitary sheet metal member suitably bent to shape. Provided in the front cover 14 is an on-off switch 26 and a pilot light 28 to indicate when the machine 10 is ready. The switch 26 includes a pilot light to indicate when the switch is on. Briefly, in operation a carrier or pouch containing elements to be laminated is inserted into the opening 30 defined in the front of the laminating machine 10. The feeding rollers within the machine feed the carrier between heated platens, wherein the elements are preliminarily laminated one to the other. The carrier is withdrawn from the heated platens by means of expeller rollers which complete the lamination, and moved to a cooling station between a pair of cooling plates. The carrier can be removed from between the cooling plates ready for use.

Turning now to FIGS. 2, 3 and 4, the details of construction of the present invention will be made more apparent. The housing 12 includes a pair of parallel spaced-apart side walls or support members 29, 31. Retention brackets 25 and 27 are secured to the side walls adjacent the front of each. The side covers 16 and 18 engage over the front end of the retention brackets and each is secured at its rear to a respective side wall by suitable retention means, for example, screws 23. The side walls 29, 31 are secured in position by means of being connected to the front and rear covers 14, 20 and the bottom 21.

A pair of feeding rollers 32 and 34 are adapted to receive a carrier containing elements to be laminated through the front opening 30 in the laminating machine. The opening 30 is defined between the support plate 36 and the guide 38, which is a downturned portion of top cover 22. The carrier C containing the elements L to be laminated one to the other is fed through the opening 30. Carrier C is received by the feeding rollers 32 and 34 and forwarded from the rollers to the rearwardly converging entrance opening defined between the heated platens 40, 42. As shown, platens 40 and 42 are secured to the plate-like heaters 45 and 46 that are connected in electrical circuit and are adapted to be heated when switch 26 is turned on. The amount of heat provided to each platen 40, 42 from heaters 45, 46 is controlled by a suitable thermostatic switch element 47 connected in circuit with the heaters 45 and 46, respectively. Thermostatic switch element 47' controls the energization of pilot light or ready light 28.

A feature of the present invention is the manner of mounting the platens 40, 42 such that the forward ends thereof act to squeeze out most of the entrapped air between the elements to be laminated before the components thereof are laminated or sandwiched together. A screw 56 is threaded into platen 42 adjacent the forward edge and at each side and extends upwardly through an enlarged opening within the platen 40. Preferably, an eyelet 57 is provided in each opening in platen 40 and the screw 56 is movable relative to the eyelet and platen. Disposed about the upper end of screw 56 between the head thereof and the top of platen 40 is a spring 58 (FIGS. 4 and 7). Platen 40 is movable relative to platen 42 which is fixedly carried in the housing by a bracket member 59, 60 secured to each side wall 29, 31. Thus, the forward end of the platen 40 is biased downwardly toward forward portion of the platen 42 by the spring 58. Additionally, it is noted that the forward ends of the platens 40, 42 are tapered convergingly rearward so as to form a mouth or entrance opening for more readily receiving the carrier C inserted into the housing means through the opening 30 and forced rearwardly by the cooperative action of the feeding rollers 32, 34. The platens 40, 42 are constructed and arranged so that there is a total spring bias force over the entire platen area which is light enough to permit use of low-mass paper type carriers C to hold the elements to be laminated together.

Rearwardly of the platens 40 and 42, there are rotatably mounted within the housing means a pair of expeller rollers 48, 50, which are adapted to receive the laminated elements from the platens and move same to a cooling station defined by a pair of plate members 52, 54 which form a heat sink for removing heat from the carrier and cooling the laminated elements.

The manner of mounting the feeding rollers and expeller rollers such that the feeding rollers will be separated once the carrier C enters the expeller rollers is another feature of this invention. The ends of the rollers 34 and 50 are journalled in bearings 66 and 68 secured in the side walls 29, 31 forming a portion of the housing of the laminating machine 10. The rollers 32 and 48 are journalled in bearings 76, 78 carried in link members 79 and 80 that are pivoted at their rear ends about pivots 81, 82 on side walls 29, 31.

Preferably, the rollers 32, 34, 48 and 50 are each comprised on a steel axle or shaft having a resilient roller member thereon formed, for example from rubber.

It will be seen from FIGS. 5 and 6 that key hole shaped openings 85, 86 are provided in the side walls 29, 31. Each opening 85, 86 has a reduced portion for receiving and holding a bearing 66, 68. The shaft or axle of roller 48 extends through the enlarged portion of the key hole opening 85, 86 and thus the roller 48 is able to move away from the roller 50. It will be understood that rollers 32, 34 are mounted in the same fashion as rollers 48, 50. The forward ends of each of the link members 79, 80 are biased downwardly by spring means 83, 84, which are connected at one end to a respective link member 79, 80 and at the other end to a side wall member 29, 31. By virtue of the present manner of mounting the feeding roller 32 and the expelling roller 48, when a carrier C leaves the space between the platens 40, 42 and enters between the expeller rollers 48 and 50, the links 79, 80 will be moved or pivoted about pivots 81, 82. Since the roller 32 is carried further from the axis of pivot points than the roller 48, there will be greater movement of the roller 32 and hence, the roller 32 will be moved away from or separated from the roller 34. The relative spacing between the pivot points 81, 82 for the link members 79, 80, respectively, and the mounting of rollers 48 and 32 is selected to achieve the desired separation of the rollers 32, 34 as a carrier C enters between the expeller rollers 48, 50.

The feeding rollers and expeller rollers are adapted to be driven by a drive motor 90 through a gear train which includes a motor gear unit 91 operatively connected to gears 92, 93, 94 and 95. The drive gear 92 is on the output shaft of the motor gear unit 91. The gear 93 is operatively connected to the expeller roller 50. Idler gear 94 is journalled in the side wall 31 of the frame means and gear 95 is connected to the feed roller 34.

In use, actuation of the switch 26 of the "on" position will cause energization of the motor 90 and simultaneous operation of the feeding rollers 32, 34 and expeller rollers 48, 50 through the gear train. It will be understood that the resistance heaters 45 and 46 for the platens 40 and 42 are also in circuit with the motor 90 and will be energized when the switch 26 is turned on.

Another feature of this invention is the cooling station provided between the plates 52 and 54 disposed rearwardly of the expeller rollers 48 and 50. As shown, plate 52 is resiliently mounted and biased toward the fixed plate 54 by means including a pair of upright posts 104, each having a spring 102 disposed thereabout and a retaining cap or nut 106 on the top thereof. One post 104 is disposed on each side of the laminating machine 10 to assist in positioning and maintaining the plate 52 as desired.

Driven from the output shaft 89 of the motor 90 is a circulating fan 108 which is adapted to provide for cooling of the lower plate 54. Vent openings are provided in the side walls 29, 31 as indicated at 112 and 113, for example, to provide for through circulation of the air and thereby help maintain the plate 54 cool. As illustrated, only the lower plate 54 is directly cooled by air circulated by the fan 108. The housing is constructed and arranged so that air may also be circulated by fan 108 through openings 112 and 113 in the side walls, between the side walls and side covers 16 and 18, and back through the tops of the openings in the side walls 29, 31 for passage over the upper plate 52 to further effect cooling thereof.

Briefly summarizing operation of the laminating machine 10, a carrier C containing the elements to be laminated is fed through the opening 30 in the front of the machine. The carrier C will be received by the feeding rollers 32, 34 and fed rearwardly into the space between the platens 40, 42. The bias force of springs 58 will urge platen 40 downwardly at the forward end thereof so as to expel entrapped air from between the lamination elements L before the components are sandwiched or fused together. Preferably, the components are so arranged that rollers 48 and 50 will receive a carrier C prior to its release from rollers 32, 34. The carrier C is of a length that it will be fed from the feeding rollers and engaged by the expeller rollers so that the expeller rollers 48, 50 can in fact withdraw or pull the carrier C through the platens 40, 42. As the front end of the carrier C enters between the expeller rollers 48 and 50, the link members 79, 80 will be pivoted about the pivot points 81, 82 so as to cause separation of roller 32 from roller 34. The carrier C is then fed from expeller rollers 48, 50 through the cooling plates 52, 54 for cooling of the carrier and laminated sandwich therein. The carrier C is removed from the rear of the laminating machine and the laminated sandwich is removed from between the carrier. If the elements to be laminated included a pre-cut pouch or sized plastic sheets, then further trimming would not be required. On the other hand, if a pair of plastic sheets were utilized to laminate a card that were not accurately sized prior to use, then cutting to a predetermined size might be necessary. The cooling plates are preferably of a length from front to rear less than the length of carrier C, whereby the expeller rollers 48, 50 will position the lead end of a carrier C rearward of the plates 52, 54 so that it can easily be removed from the laminating machine.

There has been provided by the present invention an improved packet-type laminating machine that desirably biases the heated platens so as to provide an area of high unit pressure at the point of entry of a carrier into the platens, with minimal pressure over the remainder of the platen area. This arrangement functions to squeeze out most of the entrapped air before the elements to be laminated are fused together. By virtue of the unique arrangement of mounting the feeding rollers and expeller rollers, it is not necessary that speed and alignment of both sets of rollers be precise in order to prevent buckling or twisting of the carrier in operation. The improved packet-type laminating machine of this invention includes a novel arrangement for cooling the carrier containing the laminated sandwich of elements. Through utilization of the present invention, a succession of carriers may be fed through the laminating machine and proper spacing will be achieved automatically. A variety of laminating films can be used in the novel laminating machine with equal facility.

While a presently preferred form of the present invention has been described for purposes of illustration, it will be appreciated that this invention may be otherwise embodied within the scope of the following claims.

I claim:

1. A packet-type laminating machine comprising housing means, rotatable feeding rollers in the housing means, a pair of cooperating heated platens in the housing means adjacent the rotatable feeding rollers, the heated platens to receive the elements to be laminated, which are fed to the heated platens from the feeding rollers, while applying pressure thereto, biasing means for continuously urging forward portions of the heated platens toward one another under pressure to squeeze the air from between the elements prior to lamination in the platens at a lower pressure to prevent entrapment of air between the laminated elements, and rotatable expeller rollers adjacent the rear of the heated platens for drawing the laminated elements from between the heated platens.

2. A packet-type laminating machine as in claim 1 wherein the biasing means comprise springs for urging the forward portion of one heated platen toward the adjacent heated platen.

3. A packet-type laminating machine as in claim 1 wherein a feeding roller and an expeller roller are mounted rotatably in a link member, said link member being supported on the frame means in such manner that the feeding rollers are moved away from one another when the laminated elements enter the expeller rollers.

4. A packet-type laminating machine as in claim 3 wherein the housing means includes a frame supporting and each link member is pivoted on the frame support rearwardly of the axis of the expeller roller mounted thereon.

5. A packet-type laminating machine as in claim 3 including cooling means adjacent the expeller rollers for cooling the laminated elements, said cooling means comprising a pair of plates movable relative to one another to contactingly receive the laminated elements therebetween.

6. A packet-type laminating machine as in claim 5 wherein one plate is biased toward the other plate.

7. A packet-type laminating machine as in claim 6 wherein a cooling fan is provided in the housing means to cool at least one of said plates.

8. A packet-type laminating machine as in claim 1 wherein the elements to be laminated comprise a card-like member to be protected and protective film to be secured on opposite sides of the card-like member, the elements being adapted to be inserted into a carrier, whereby in use the carrier is inserted into the feeding rollers and passes between the heated platens in contact therewith to laminate the elements together.

9. A packet-type laminating machine comprising housing means; rotatable feeding rollers in the housing means; a pair of heated platens in the housing means adjacent the rotatable feeding rollers, the heated platens adapted to receive the elements to be laiminated, which are fed to the heated platens from the feeding rollers, while applying pressure thereto; means for biasing the forward portion of the heated platens toward one another to squeeze the air from between the elements prior to lamination to prevent entrapment of air between the laminated elements; and, rotatable expeller rollers adjacent the rear of the heated platens for drawing the laminated elements from between the heated platens, a feeding roller and an expeller roller mounted rotatably in a link member, said link member being supported on the frame means in such manner that the feeding rollers are moved away from one another when the laminated elements enter the expeller rollers.

10. A packet-type laminating machine as in claim 9 wherein the biasing means comprise springs for urging the forward portion of one heated platen toward the adjacent heated platen.

11. A packet-type laminating machine as in claim 9 wherein the housing means includes a frame support and each link member is pivoted on the frame support rearwardly of the axis of the expeller roller mounted thereon.

12. A packet-type laminating machine as in claim 9 including cooling means adjacent the expeller rollers for cooling the laminated elements, said cooling means comprising a pair of plates movable relative to one another to contactingly receive the laminated elements therebetween.

13. A packet-type laminating machine as in claim 9 wherein a cooling fan is provided in the housing means to cool at least one of said plates.

14. A packet-type laminating machine as in claim 9 wherein the elements to be laminated comprises a card-like member to be protected and protective film to be secured on opposite sides of the card-like member, the elements being adapted to be inserted into a carrier, whereby in use the carrier is inserted into the feeding rollers and passes between the heated platens in contact therewith to laminate the elements together.

15. A packet-type laminating machine comprising housing means, rotatable feeding rollers in the housing means, a pair of cooperating heated platens in the housing means adjacent the rotatable feeding rollers, the heated platens adapted to receive the elements to be laminated, which are fed to the heated platens from the feeding rollers, while applying pressure thereto, rotatable expeller rollers adjacent the rear of the heated platens for drawing the laminated elements from between the heated platens, and cooling means adjacent the expeller rollers for cooling the alminated elements, said cooling means comprising a pair of plates movable relative to one another to contactingly receive the laminated elements therebetween.

* * * * *